(12) United States Patent
Ricci et al.

(10) Patent No.: US 6,447,220 B1
(45) Date of Patent: Sep. 10, 2002

(54) PORTABLE BORING/FACING MACHINE

(75) Inventors: Donato L. Ricci, W8477-162$^{nd}$ Ave., Hager City, WI (US) 54017; Martin A. Gardzinski, Red Wing, MN (US)

(73) Assignee: Donato L. Ricci, Hager City, WI (US)

( * ) Notice: Subject to any disclaimer, the term of this patent is extended or adjusted under 35 U.S.C. 154(b) by 158 days.

(21) Appl. No.: 09/610,079

(22) Filed: Jul. 5, 2000

(51) Int. Cl.$^7$ ................................................ B23B 41/00
(52) U.S. Cl. ..................... 408/72 R; 408/102; 408/124; 408/129; 408/708; 82/1.4; 82/113
(58) Field of Search ............................ 408/79, 80, 102, 408/124, 129, 708, 72 R; 82/113, 1.4

(56) References Cited

U.S. PATENT DOCUMENTS

| | | | |
|---|---|---|---|
| 3,915,585 A | 10/1975 | Eckle | |
| 3,981,210 A | 9/1976 | Janiszewski | |
| 4,004,858 A | 1/1977 | Szilva | |
| 4,011,793 A | 3/1977 | Grimsley | |
| 4,063,842 A | 12/1977 | Barkley et al. | |
| 4,184,794 A | 1/1980 | Henninghaus | |
| 4,507,850 A | 4/1985 | Kielma | |
| 4,573,837 A | 3/1986 | Flaten | |
| 4,580,931 A | * 4/1986 | Wilger et al. | ................ 408/708 |
| 4,652,186 A | 3/1987 | Sverdlin | |
| 4,742,738 A | 5/1988 | Strand | |
| 4,756,648 A | 7/1988 | Cusack | |
| 4,758,121 A | * 7/1988 | Kwech | ........................ 82/1.2 |
| 4,850,756 A | * 7/1989 | Dubois | ....................... 408/708 |
| 4,932,814 A | 6/1990 | York | |
| 5,030,041 A | * 7/1991 | Marron | ........................ 408/80 |
| 5,050,291 A | * 9/1991 | Gilmore | ....................... 82/128 |
| 5,056,389 A | * 10/1991 | Johnstead | ..................... 82/128 |
| 5,159,862 A | 11/1992 | Byrnes et al. | |
| 5,209,615 A | 5/1993 | Davis | |
| 5,288,182 A | 2/1994 | Patterson et al. | |
| 5,642,969 A | * 7/1997 | Strait | ......................... 408/124 |
| 5,655,857 A | 8/1997 | Catenacci | |
| 5,785,466 A | 7/1998 | Haynes | |

\* cited by examiner

Primary Examiner—Steven C. Bishop
(74) Attorney, Agent, or Firm—Nikolai & Mersereau, P.A.; Thomas J. Nikolai (57) ABSTRACT

A portable boring/facing machine having a rotatable boring bar on which is supported a cutting head assembly that is adapted to be axially translated by a lead screw drive powered by an AC variable speed servo motor is provided with mounting brackets attachable to the work piece that incorporate a swivel mechanism for facilitating alignment of the boring bar with the centerline of the work piece.

16 Claims, 7 Drawing Sheets

PORTABLE BORING/FACING MACHINE

BACKGROUND OF THE INVENTION

I. Field of the Invention

This invention relates generally to metal working machines, and more particularly to a portable boring bar assembly that can be used to rebore cylindrical apertures and/or reface flange surfaces such as may be found on valves and other pipe or casing fittings in the field, and which is simple and quick to install and operate.

II. Discussion of the Prior Art

Portable boring bars are known in the art. They generally consists of an elongated, cylindrical bar having a tool bit mounted thereon where the cylindrical bar is journaled for rotation in a frame attachable to the work piece. A first drive member may be used to rotate the bar and a second drive member provides axial feed to the bar and the first drive member. See, for example, the York U.S. Pat. No. 4,932,814, the Flaten U.S. Pat. No. 4,573,837, and the Sverdlin U.S. Pat. No. 4,652,186.

In the York '814 patent, there is described an arrangement in which a cylindrical boring bar is journaled for rotation in a pair of supports, one of which is axially movable via a lead screw and is adapted to translate the boring bar and its rotary drive motor assembly. A boring tool is mounted along the length of the boring bar and projects radially there from for engaging the wall of a cylindrical bore to be refurbished.

It is to be noted that in the York machine, the source of rotational power for the boring bar can only be attached to one end of the boring bar and, likewise, the drive motor for the axial displacement of the boring bar can only be located at one end of the feed screw utilized. These constraints may render the York machine unusable in a variety of situations encountered in the field where obstructing structures get in the way of placement of the machine relative to a particular work piece to be refurbished. A much more facile machine results where the mechanism for rotating the boring bar as well as the drive for translating the cutting head can be adjustably positioned any where along the length of the boring bar.

Properly aligning the boring bar of the York '814 patent with the central axis of the bore of the work piece to be refurbished may also prove difficult. As is explained in that patent, the boring bar 12 is passed through the bore of the work piece and bearing collars 42 and 44 are assembled onto opposite ends of the boring bar and advance therealong until the work piece is sandwiched between the bearing collars. At this point, the boring bar must be manipulated to align it properly within the bore of the work piece, whereupon the bearing collars 42 and 44 are welded to the work piece. In practice, the alignment of the boring bar with the axis of the bore of the work piece would be difficult and time consuming It is accordingly one object of the present invention to provide a portable boring/facing machine incorporating a boring bar with first and second drive mechanisms that are positionable theoretically at an infinite number of locations along the length of the boring bar rather than being confined to an end thereof.

A further object of the invention is to provide a portable boring/facing machine having a boring bar mounting arrangement that simplifies the alignment process.

Another object of the invention is to provide a portable boring/facing machine where the boring bar is adapted to be driven via gear box transmission, thereby increasing the torque available as compared to a directly driven boring bar.

Another object of the invention is to provide an accessory cutting head member adapted to be assembled onto a boring bar and providing radially displacement of a cutting tool for use in facing operations.

A still further object of the invention is to provide a portable boring bar machine having precise control over the feed rate of a cutting tool relative to the work piece being refurbished.

SUMMARY OF THE INVENTION

The foregoing objects and advantages are realized by the present invention in which a boring/facing machine comprises an elongated, generally cylindrical, rigid boring bar member that is journaled for rotation in a pair of spaced-apart mounting brackets attachable to the work piece to be refurbished. The mounting brackets each have a bore with an internal concave spherical surface that cooperates with an external convex spherical surface of a bearing retainer member. The bearing retainer member of each mounting bracket contains a set of bearings for journaling the boring bar member. Because of the cooperation of the spherical surfaces in the bore of the mounting brackets and on the bearing retainers, centering an alignment of the boring bar with a central axis of the work piece to be machined is facilitated.

The boring bar supports a cutting head member thereon which rotates with the boring bar when a first drive motor is activated. A second drive motor provides axial (longitudinal) translation of the cutting head member.

In accordance with a first embodiment, the axial translation of the cutting head is along the length of the boring bar and is achieved by using a lead screw powered by the second drive motor, the lead screw being journaled for rotation within a channel or groove in the surface of the boring bar. The lead screw carries a traveling nut that engages the cutting head member.

In a second embodiment, the cutting head member is positionable along but fixed in place at a predetermined location on the boring bar member at the time of set-up, and the boring bar, with the cutting head member, is axially translated, again using a lead screw driven by the second drive motor.

In either embodiment, the cutting head member may comprise a boring tool support when a cylindrical wall surface of the work piece is to be rebored or, alternatively, may provide radial movement of a cutting tool in the case of a refacing operation.

In either of the aforementioned two embodiments, the first drive motor is indirectly coupled to the boring bar via a gear box that is positionable at a selectable location along the length of the boring bar. Also, the lead screw is arranged to be driven by a variable speed servo motor, whereby the longitudinal feed of the cutting head member can be precisely controlled by adjusting the voltage applied to the servo drive motor.

DESCRIPTION OF THE DRAWINGS

The foregoing features, objects and advantages of the invention will become apparent to those skilled in the art from the following detailed description of the preferred embodiments in which like numerals in the several views refer to corresponding parts.

DESCRIPTION OF THE PREFERRED EMBODIMENTS

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Figure 1:
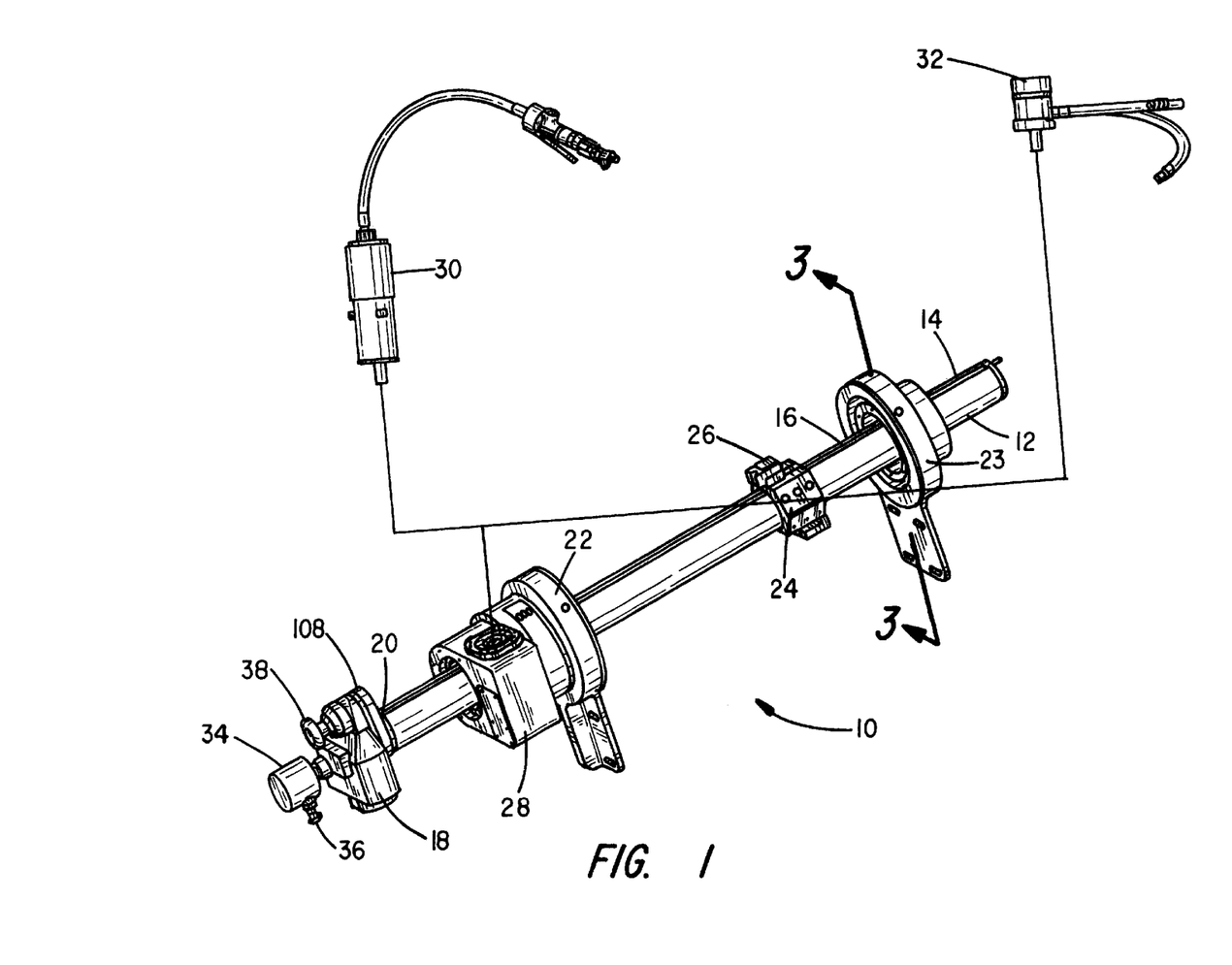
FIG. 1 is an isometric view of a first embodiment of the present invention.
Figure 2:
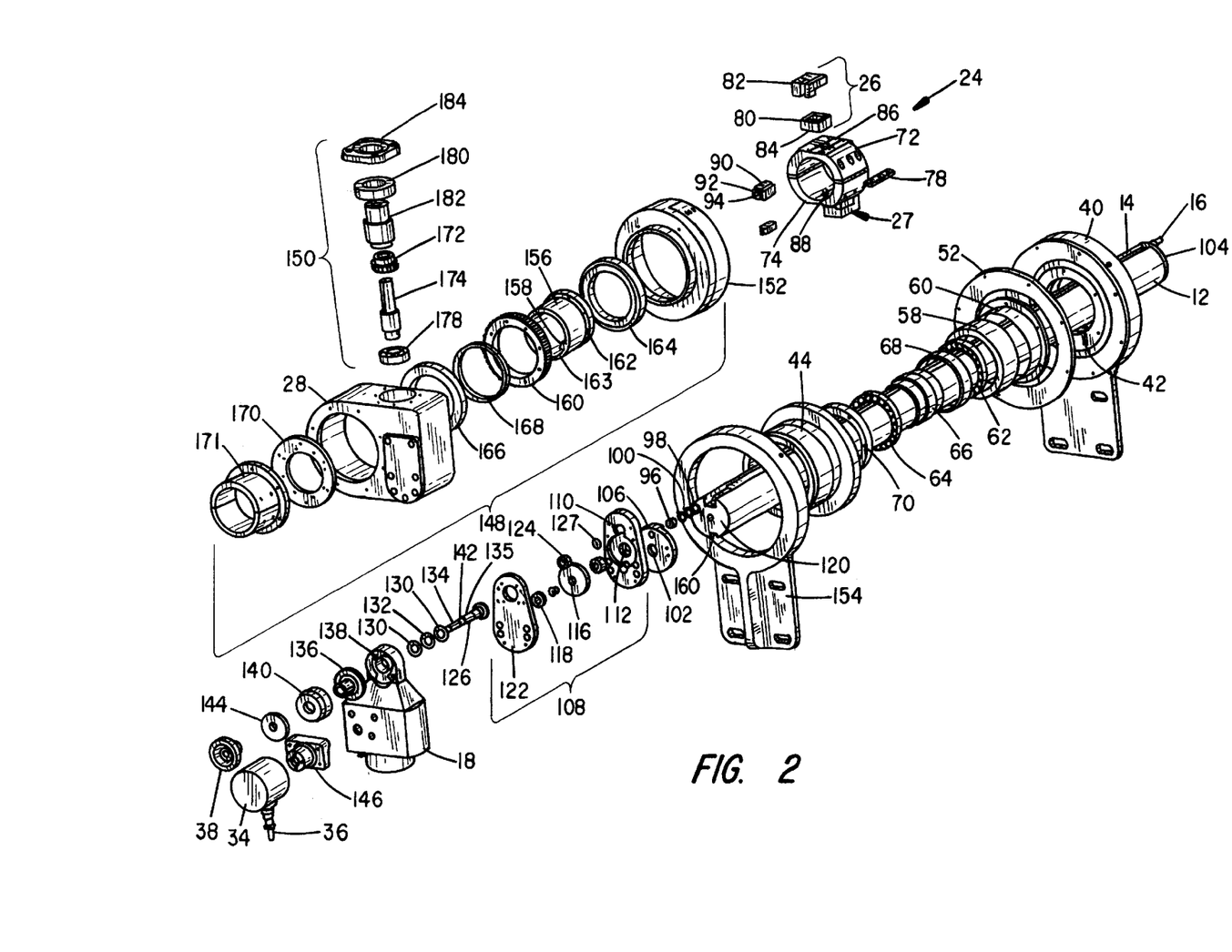
FIG. 2 is an exploded view of the embodiment of FIG. 1.

Referring first to FIG. 1, there is indicated generally by numeral 10 a portable boring bar machine constructed in accordance with a first embodiment of the invention. It is seen to comprise an elongated, generally cylindrical, hardened steel bar member 12 that has a longitudinal groove 14 formed inwardly from a peripheral surface thereof which extends the entire length of the bar 12. Contained within the groove or channel 14 is a threaded lead screw 16 that is journaled for rotation within that groove. It is preferably driven by a servo feed motor 18 that is affixed to the left end 20 of the bore bar member 12 in a manner that will be further explained when the exploded view of FIG. 2 is discussed.

The bore bar 12 is journaled for rotation in a pair of parallel, spaced-apart swivel mount brackets 22 and 23 that are adapted for attachment, either directly or indirectly, to a work piece to be refurbished (not shown). As will be explained in greater detail hereinbelow, each of the mounting brackets 22 and 23 captures a swivel retainer that includes a bore having an internal concave spherical surface that cooperates with a bore bar swivel member that has an external convex spherical surface. This arrangement permits the boring bar 12 to be more easily centered on the center line of the work piece. Slidingly disposed about the boring bar 12 is an annular cutting head member 24 that is operatively coupled to the lead screw 16 by means of a traveling nut (not shown) in FIG. 1 on the lead screw that engages the cutting head member 24. The cutting head member 24 includes a tool holder 26 adapted to clamp a tool bit (not shown).

Disposed about the boring bar 12 and affixed to the mounting bracket 22 is a boring bar drive housing 28 which contains a gear transmission for rotationally coupling either an air motor, as at 30, or a hydraulic motor, as at 32, or an electric motor (not shown) to the drive housing 28 to effect rotation of the boring bar 12 about its longitudinal axis.

In that the servo motor 18 for driving the lead screw 16 is affixed to the left end 20 of the boring bar and thus rotates with the boring bar, a slip ring assembly 34 is used to connect electrical power, via cable 36, to the servo motor in a manner well known in the art.

When the drive motor 30 or 32 is energized, the boring bar 12 and the cutting head assembly 24 rotate about the longitudinal axis of the boring bar 12. At the same time, the servo motor 18, acting through the lead screw 16 disposed in the groove or channel 14 of the boring bar, translates the cutting head assembly 24 in the axial direction. The translation of the cutting head 24 may also be manually carried out by rotation of a hand wheel 38, which is also mechanically coupled, through gearing in the gear reduction housing, to the leftmost end of the lead screw 16.

Having described, in general terms, the construction and mode of operation of the first embodiment, consideration will next be given to a more detailed description of the aid of the exploded perspective view of FIG. 2 and the cross-sectional view of FIG. 3.

Figure 3:
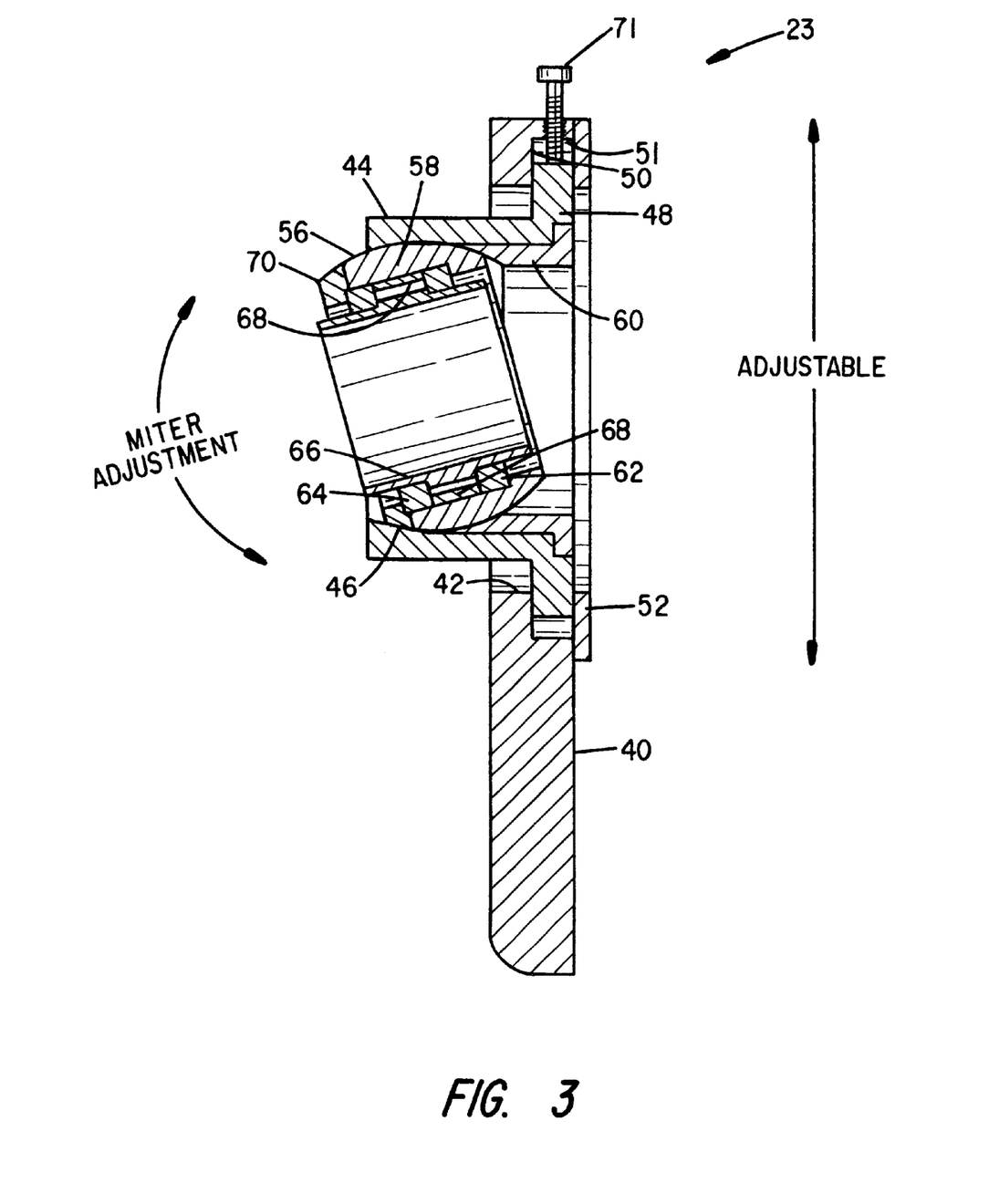
FIG. 3 is a cross-sectional view of the swivel mounting bracket taken along line 3—3 in FIG. 1.

With reference now to the exploded view of FIG. 2, and the cross-sectional view of FIG. 3, the boring bar 12 is adapted to be mounted to a work piece (not shown) through the use of the bore bar swivel mounting bracket assemblies 22 and 23. The bracket assemblies 22 and 23 are identical and the components comprising the mounting bracket 23 only are included in the exploded view of FIG. 2. Each of the mounting bracket assemblies comprises a mounting bracket member 40 having a bore 42 defined therein. Fitted through the bore 42 is a bore bar swivel housing member 44 having a concave spherical surface 46 formed thereon and an integrally formed flange 48 that is adapted to be captured against an annular shoulder 50 created by a counterbore 51 in the bracket member 40. A cover member 52 bolts to the bracket member 40 to retain the bore bar swivel housing member 44 in position.

As is indicated in FIG. 3, the outside diameter of the flange 48 is somewhat less than the inside diameter of the counterbore 51 in the bracket 40, allowing adjustable shifting of the flange 48 within the counterbore of the bracket member 40 for alignment purposes. Fitted within the bore bar swivel housing 44 and having a convex spherical surface 56 for cooperating with the concave surface 46 is a bore bar swivel member 58 that is maintained in position within the swivel housing 44 by a swivel retainer member 60. Supported within the bore bar swivel 58 are first and second ball bearings sets 62 and 64 that journal a swivel collar member 66 for rotation. A spacer ring 68 is disposed between the bearings 64 and 66 to maintain them in spaced-apart relation when captured by a cap member 70.

With reference to FIG. 3, then, it can be seen that the swivel collar 66, which closely surrounds the cylindrical surface of the boring bar 12, can be made to swivel as indicated by the double headed arrow labeled "MITER ADJUSTMENT", and can also be adjusted, within limits, due to the clearance between the outside diameter of the flange 48 and the inside diameter of the counterbore 51 of bracket member 40. This construction of the mounting bracket assemblies 22 and 23 greatly facilitates alignment of the boring bar with the central axis of the work piece to be machined. Once the alignment is achieved, the setting is locked in place by tightening four adjusting screws, as at 71, disposed at 90° intervals about the mounting bracket 40. These screws pass through the mounting bracket 40 to engage the swivel member 58.

When the machine of the present invention is to be used for reboring an internal cylindrical wall of a work piece, a cutting head assembly 24 is bolted in surrounding relation to the bore bar 12 and is used to hold or support a tool bit. As indicated in FIG. 2, the cutting head assembly 24 includes a pair of semicircular body members 72 and 74 which when bolted together define a central opening 76 of circular cross-section. The diameter of the opening permits the boring bar 12 to fit therethrough with a predetermined clearance which may be adjusted using a pair of spacers or shims 78 between the two halves 72 and 74 of the body member. This allows the cutting head to slide along the surface of the boring bar 12.

Mounted 180° apart on the body member are two tool bit holders 26 and 27. They each include a spacer 80 and a bit holder 82. The spacer 80 includes an alignment boss 84 on the lower surface thereof which is adapted to fit into a keyway 86 formed on the surfaces of the body members 72 and 74. Bolts (not shown) secure the tool holder 82 and the spacer 80 along with the tool bit to the body members 72 and 74. With continued attention to FIG. 2, and especially to the cylindrical surface 76 of the body member 74, slot 88 can be seen that is adapted to receive a boss 90 formed on traveling nut 92. The traveling nut 92 has a threaded bore 94 that is adapted to cooperate to with the threads on the lead screw 16 so that when the lead screw is rotated, the cutting head assembly 24 will be made to move longitudinally along the surface of the boring bar 12 and in a direction determined by the direction of rotation of the lead screw 16.

The lead screw 16 is journaled for rotation in the groove 14 by means of needle bearings 96, thrust washers 98, thrust bearings 100 which are captured in end caps 102 and 104 that bolt to opposed ends of the bore bar 12. An end portion of the lead screw 16 extends through an aperture 106 in the end cap 102 and into a gear box assembly shown as enclosed by brackets 108.

The gear box assembly, itself, includes a housing member 110 having a central aperture 112 through which the leftmost end of the lead screw passes. A Timkin cup bearing 114 is disposed on the end portion of the lead screw and fits within a cavity in the gear box housing member 110. A helical gear 116 is keyed to the end of the lead screw and a further bearing, preferably a Timkin cone bearing 118, is provided for securing the helical gear 116 in a centered location within the cavity 120 of the gear box housing 110. A cover plate 122 bolts to the housing member 110.

The helical gear 116 is arranged to mesh with a smaller diameter helical gear 124, which mounts on a axial feed shaft 126 fitting within a thrust bushing 127 which fits into circular bore 128 of the housing member 110. The shaft 126 is supported by thrust bushing 127, thrust washer 130 and thrust bearing 132 which are used to accept thrust loads. Keyed to the end portion 135 of the axial feed shaft 126 is a miter gear 136 which resides within a pocket or cavity 138 of the servo drive motor assembly. It meshes with a further miter gear (not shown) driven by the shaft of the servo motor 18 for providing rotational torque to the axial feed shaft 126, sandwiching cup 140 and gear 136 on shaft 126. A retainer cup 140 screws onto miter gear 136 within the cavity 138. A lock washer 144 screws onto a treaded zone 142 of shaft 126. The hand wheel 38 then is keyed to the end 134 of the shaft.

As mentioned earlier, electrical power is applied to the servo motor 18 through a slip assembly 34 that mounts to the servo motor housing, using a mounting adapter 146.

From what is described thus far, it can be seen that when the servo motor 18 is energized to drive the axial feed shaft 126, it, in turn, drives the lead screw shaft 16, via the speed reducing gear box 108, causing the tool supporting cutting head to move axially along the bore bar 12 in a direction that depends upon the direction of rotation of the lead screw.

Next to be described is the mechanism for rotating the bore bar 12 itself. It includes the assembly identified by brackets 148 and 150. The bore bar drive assembly 148 and 150 attaches to the swivel housing 152 of the left end mounting bracket 154 which, it will be recalled, contains the machine parts 44, 70, 64, 66, 68, 62, 58, 60 and 52 associated with the right-hand bore bar mounting bracket assembly 23. The bore bar drive housing 28 is bolted to the swivel housing 152. Contained within the housing is the main drive bore bar collar 156 which has an elongated rectangular boss 158 projecting outwardly from the interior cylindrical wall thereof. This boss is adapted to fit within a keyway 160 that is formed along the length of the bore bar 12, allowing the collar 156 to slide longitudinally but not rotate relative to the bore bar. Fitted over the outer diameter of the collar 156 is a helical drive gear 160 which bolts to a flange 162 on the collar 156. The collar is journaled for rotation within the housing 28 by Timkin bearings 164 and 166. A spacer 168 is utilized to maintain a predetermined spacing between the helical gear 160 and Timkin bearing 166. An annular collar cap 170 fastens to the left end of the main drive collar 163 by bolts (not shown) passing through aligned apertures in the collar flange 162, the helical gear 160 and the collar cap 170. A bore bar retainer 171 bolts to collar cap 170 and has two halves that are bolted together to prevent bore bar 12 movement during cutting.

The helical gear 160 is arranged to mesh with a smaller diameter helical gear 172 that is keyed to a shaft 174 journaled for rotation within a bore 176 in the housing 28 by means of bearings 178 and 180. A spacer 182 also mounts on the shaft 174 and it provides support for the bearing 180. A retainer 184 attaches to the housing 28 in covering relation to the bore 176.

From what has been thus far described, it is apparent that the drive assembly 148, 150 is slidably positionable anywhere along the length of the boring bar 12 and when a suitable drive motor, be it hydraulic, air or electric, is coupled to drive the shaft 174 bys pacer 182, the helical gear 172, being engaged with the helical gear 160 will rotate the main drive collar 156. Because the collar 156 is keyed to the boring bar 12, it too rotates. Given the gear ratio between the helical gears 172 and 160, the rate of rotation of the boring bar is substantially less than the drive motor's shaft speed while the torque on the boring bar is greatly magnified.

Second Embodiment

Figure 4:
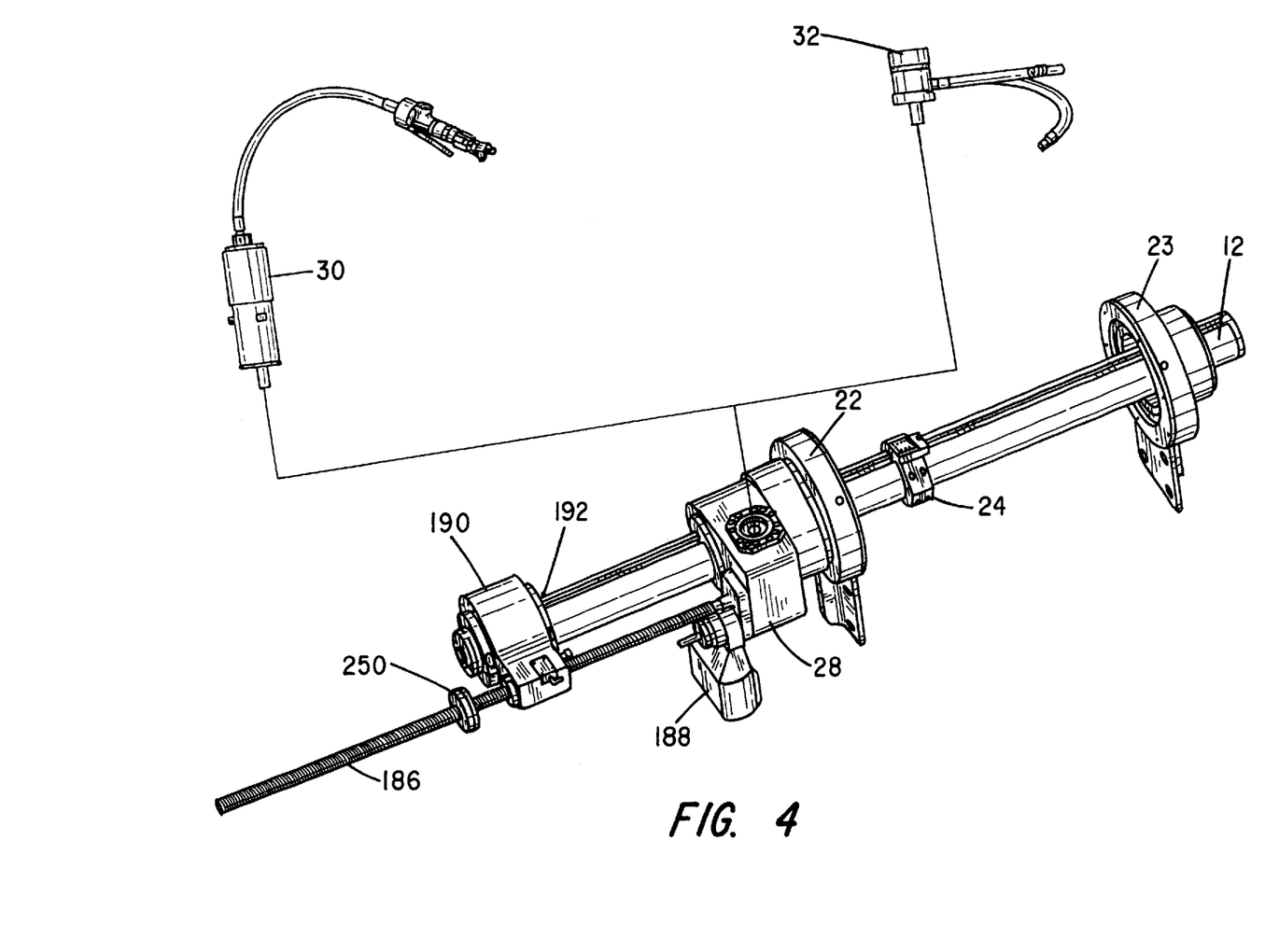
FIG. 4 is an isometric view of an alternative embodiment of the invention.
Figure 5:
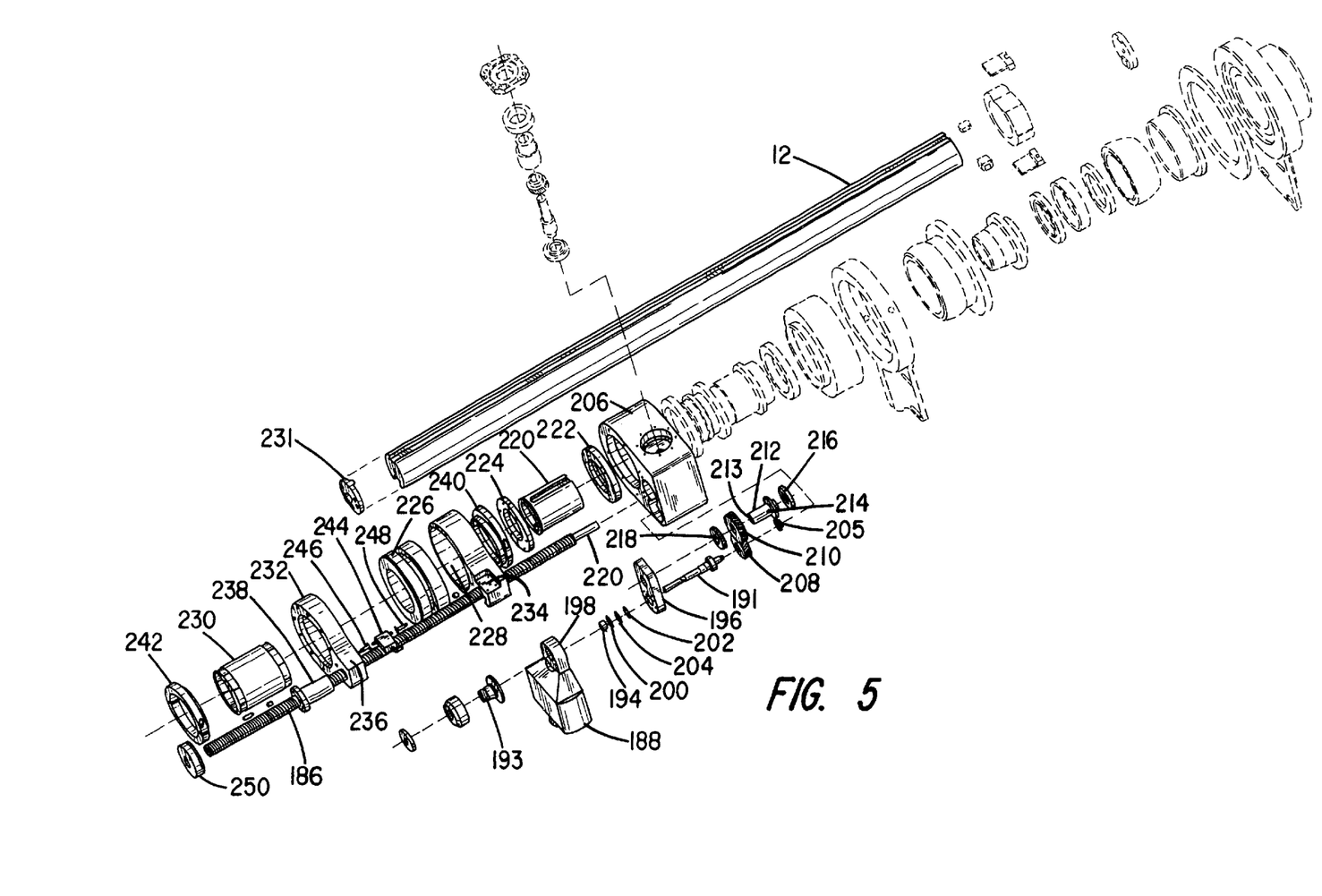
FIG. 5 is an exploded view of the embodiment of FIG. 4.

FIGS. 4 and 5 depict a second embodiment of the present invention in which the cutting head assembly remains fixed at a desired predetermined longitudinal position on the boring bar and a mechanism is provided for displacing the boring bar itself in the longitudinal (axial) direction during the machining of a work piece.

Referring to FIG. 4, the boring bar 12 is journaled for rotation in mounting bracket assemblies 22 and 23 that are identical in all respects to the mounting brackets described for the embodiment of FIG. 1. Likewise, the cutting head assembly 24 may also be identical to that previously described or, alternatively, the cutting head assembly may not require the traveling nut as at 92 in FIG. 2. Moreover, there is no need to journal a lead screw in a longitudinal channel or groove formed inwardly from the surface of the boring bar 12. Likewise, the bore bar drive housing 28 fastens to the left end bracket 22 and is driven by a suitable motor 30 or 32 to cause rotation of the boring bar about its longitudinal axis.

The push-pull mechanism for axially displacing the boring bar along with the cutting head assembly which it carries comprises an elongated threaded lead screw 186 that is adapted to be driven by a servo feed motor 188 to displace the servo feeder control housing assembly 190 which is clamped to the leftmost end 192 of the boring bar 12. The ball nut associated with the feed screw 186 cooperates with the housing 190 such that when the lead screw is made to rotate, the bore bar 12 will be displaced axially in a direction determined by the direction of rotation of the lead screw.

Having generally described the constructional and operational features of the second embodiment with the aid of the perspective drawing of FIG. 4, consideration will next be given to a more detailed description of the axial drive mechanism employed. In that the boring bar, the mounting bracket assemblies for journaling same and the mechanism for driving the bore bar circumferentially is the same in the embodiment of FIG. 5 as in the embodiment of FIG. 2, there is no need to describe in detail the various parts involved with those structures. They are included in FIG. 5 for reference purposes only. Particular attention will be directed only to the revised axial drive mechanism utilized.

Keeping the above in mind and referring to FIG. 5, the threaded lead screw 186 is adapted to driven by servo drive motor 188. A shaft member 191 is driven by the servo motor 188 by means of a miter gear 193 that mounts on the shaft 191 and it cooperates with a drive gear (not shown) contained within the housing of the servo motor 188. The shaft 191 is journaled for rotation by a pair of thrust washers 200 and 202 and by thrust bushings 204 and 205 which are designed to accept longitudinal thrust loads. An internal needle bearing in the servo 188 and the bushing 205 accept radial thrust. The cover 196 for the servo feed gear box bolts to the bore bar drive housing 206. There is contained within that housing, on the shaft 190, a spur gear 208 that is driven by the servo motor 188 and which, in turn, is made to drive a mating spur gear 210 mounted on the tubular shaft 212 of a servo feed screw adapter member 214. Bearings 216 and 218 are used to journal the adapter 214 for rotation within the housing 206 and the internal tubular portion 213 of the adapter 214 receives the rightmost end portion 220 of the lead screw 186 therein.

In that the machine of the present invention is designed to accommodate boring bars of differing diameter (e.g., 2 in., 3 in., 4 in.), adapters are provided, where necessary, to fit the particular boring bar to the drive assemblies. For example, if a 2 inch diameter boring bar 12 is to be employed rather than a 4 inch diameter boring bar, the following parts have their internal diameters reduced to accommodate the smaller diameter boring bar: adapter 230, boring bar cap 231, adapter 220 and, of course, the parts comprising the cutting head assembly. An insert retainer member 224 bolts to the left face of the collar cap 222, allowing the sleeve to rotate with the boring bar 12.

The left end portion of the bore bar 12 extending beyond the main drive housing 206 is journaled for rotation by bearings 226 within servo feed control housing members 228 and 232.

Both the housing 228 and the cover 232 are formed with radially projecting extensions 234 and 236, respectively. These extensions include an aperture through which the lead screw 186 can pass. Threaded onto the lead screw and bolted to the cover member 232 is a ball nut 238. Bearing retainers 240 and 242 are designed to fit around the adapter 230 to hold the bearings 226 in place thereon.

An electrical limit switch 244 mounts on the extension 234 of the housing member 228 and limit switch extensions 246 and 248 pass through apertures formed in the extensions 234 and 236. Finally, a servo feed travel stop ring 250 is threaded onto the lead screw 186 and set at a desired axial location therealong.

With reference to FIGS. 4 and 5, when one of the motors 30 or 32 is coupled to the drive housing 206 in the manner already described in connection with the embodiment of FIGS. 1 and 2, the boring bar 12 will be rotationally driven, carrying the cutting head member and tool mounted therein in a circumferential path. To axial translate the boring bar with the cutting head, the variable speed AC servo motor 188 is energized, driving the lead screw 186, via the gear transmission, including miter gear 193, the gear shaft 191 and the spur gears 208 and 210 to thereby rotationally drive the servo feed screw adapter 214 which is affixed to the rightmost end 220 of the threaded lead screw 186. Rotation of the lead screw 186 causes displacement of the ball nut 238 in a direction dependent upon the direction of rotation of the feed screw. Assuming that the rotation is such that the ball nut travels to the right in FIGS. 4 and 5, it carries the servo feed housing 228 and cover 232 with it, thereby sliding the boring bar 12 to the right through mounting brackets 22 and 23. At some point in its travel, the extension 248 associated with the limit switch 244 will be brought up against the left face surface of the drive housing 206 causing the limit switch 244 to shut off the axial feed servo motor 188. In a like fashion, had the servo motor been driven to rotate the lead screw in the opposite direction, the servo feed housing 228 and cover 232 will be displaced axially to the left and travel will continue until the limit switch extender 246 is made to abut the stop nut 250, at which point the servo motor will again shut off.

Thus far, the embodiments described have been in the context of a boring operation. The machine can readily be converted to performing a facing operation by substituting a modified cutting head assembly onto the boring bar 12. Such a modified cutting head assembly is depicted in the exploded view thereof of FIG. 6.

In a facing operation, the tool bit must be made to move in a radial direction. To do this, the threaded lead screw 16 of FIG. 1 is preferably replaced by a rigid bar having a hexagonal or other non-circular cross section and that is journaled for rotation within the groove 14 in the boring bar. The rightmost end of the hex bar is made to engage an input shaft of a gear train which when rotated, produces radial travel of the tool bit.

Figure 6:
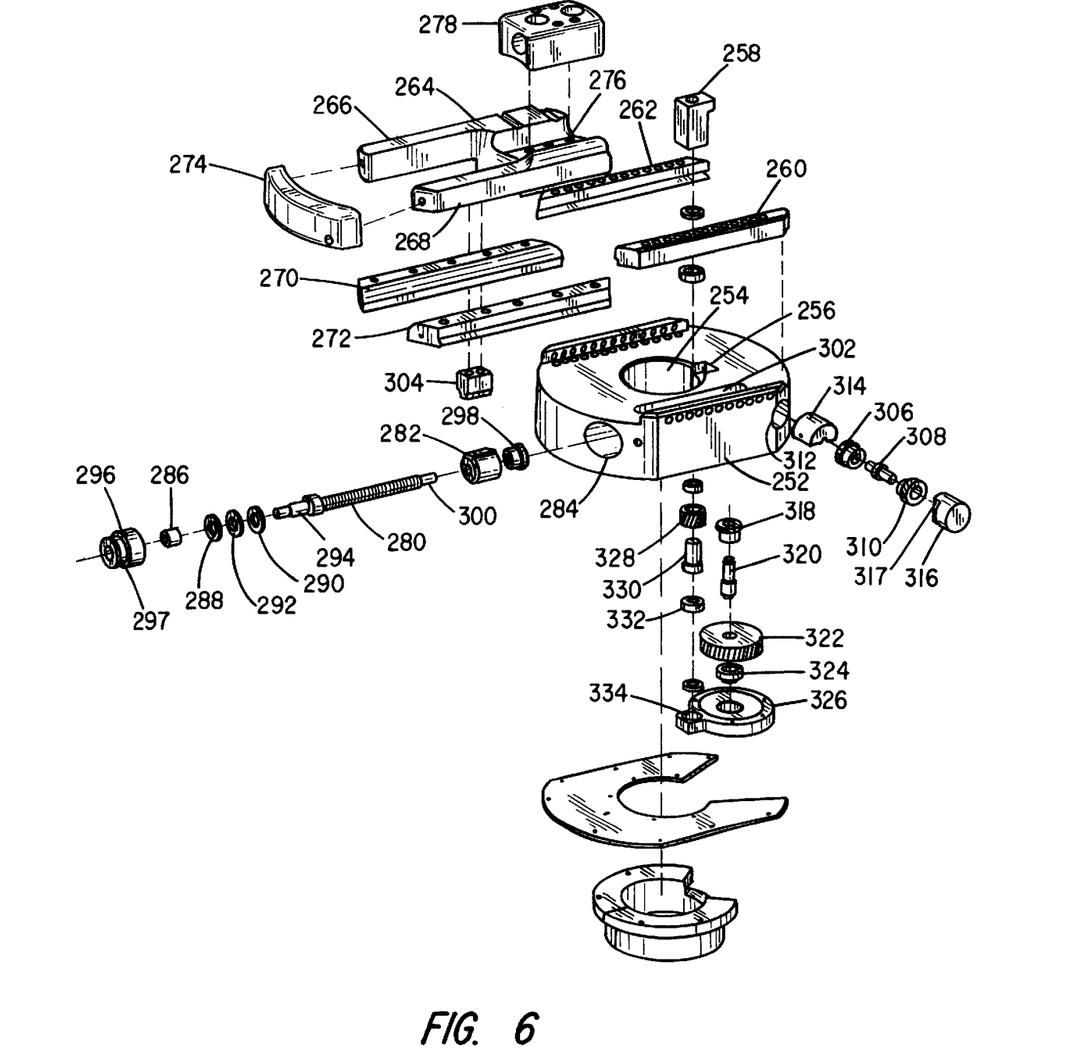
FIG. 6 is an exploded view of an alternative cutting head member for use in facing operations.

The tool head in FIG. 6 comprises a base member 252 having a central bore 254 through which the bore bar may pass. Contiguous with the bore 254 is a key way 256 into which fits a guide member 258. The guide member 258 cooperates with the longitudinal groove 160 (FIG. 2) formed in the bore bar, allowing the facing cutting head to slide along and rotate with the bore bar.

Bolted to the top surface of the base member 252 at parallel, spaced-part locations are gibs 260 and 262 which together form a dovetail groove on the upper face of the base member 252. A radial-feed facer slide member 264 that is generally U-shaped has leg portions 266 and 268. Bolted to the underside of the leg members are gibs 270 and 272 that mate with the gibs 260 and 262 on the base member 252 to permit engaged sliding motion therebetween. A brace member 274 fastens to the free ends of the legs 266 and 268. The slide 264 includes an inwardly extending groove 276 into which fits a tool block 278. The slide member 264 is made to move in the radial direction by means of a threaded shaft 280 on which is threaded a traveling nut 282. The rod is journaled for rotation within a bore 284 that extends transversely to the bore 254 in the base member 252. Needle bearing 286 and bushing block 316 on face 317 provide radial "journaling" support. Thrust washers 288 and 290 and thrust bearing 292, along with bushing block 316 at its face 317, provide thrust support. They are retained in place by a set-screw locked retainer 296 onto surface 297.

The assembly just described fits within the bore 284 and a bevel gear 298 is affixed to the right end 300 of the threaded rod 280. When installed in the bore 284, the traveling nut 282 is aligned with a slot 302 in the base member that extends down to the bore 284. A coupling lug 304 attaches to the underside of the leg 268 of the slide member 264 and also to the traveling nut 282, via the slot 302. Rotational motion is imparted to the threaded rod 280 in that the bevel gear 298 is arranged to mesh with a further bevel gear 310 mounted on one end of a pinion shaft 308. A further bevel gear 306 is affixed to the other end of the pinion shaft 308 and this assembly is journaled for rotation within a transversely extending bore 312 formed in the base member 252. Bushings 314 and 316 journal the pinion shaft 308 for rotation within the bore 312.

The bevel gear 306 is arranged to mesh with a mating bevel gear 318 which attaches to one end of a shaft 320. Also mounted on this shaft is a relatively larger diameter spur gear 322. A bushing 324 which fits into a circular aperture in a cover member 326 allows the shaft 320 to rotate when the spur gear 322 is driven.

The spur gear 322 is arranged to be driven by a small diameter spur gear 328 which is attached to an adapter 330 that is journaled for rotation by needle roller bearings 332 within a circular bore 334 formed in the cover 326.

The adapter 330 includes a recess in the bottom end thereof shaped to receive an end of the hex rod that is substituted for the lead screw 16 when the device is to be used for facing operations. The hex rod is, in turn, adapted to be driven by the AC variable speed servo motor whereby spur gears 328 and 322 provide a gear reduction to the rotational speed of the bevel gear 318 and, thus, the pinion shaft 308 on which the miter gears 306 and 310 reside. Rotation of the miter gear 310 imparts rotation to the threaded rod 280 causing translation of the slide 264 relative to its base member 252. In this fashion, the cutting tool supported by tool block 278 moves in a radial direction across the face of the work piece as the boring bar rotates.

In either of the embodiments of FIGS. 1 and 2 or 4 and 5, an auxiliary gear box can be used to mount the bore bar drive motor to its main drive housing 28 to provide full speed or half speed drive to the helical gear 172 that meshes with the bore bar drive gear 160. An exploded view of the auxiliary gear box is set out in FIG. 7 of the drawings. The gear box comprises a housing member 336 and a cover 338 therefore. The cover 338 includes first and second bores 340 and 342 over which motor mount 184 may be secured. Depending upon which of the bores 340 and 342 has the motor mount 184 secured to it, the output shaft 31 of the drive motor 30 will engage one or the other of the shafts 344 and 346. The shaft 344 carries a helical gear 348 of a relatively large diameter and the shaft is journaled for rotation in the housing by bearing sets 350 and 352. Bearing set 350 surrounds the enlarged diameter portion 345 of the shaft 344 while bearing set 352 journals the smaller diameter portion 347 of the shaft 344.

Figure 7:
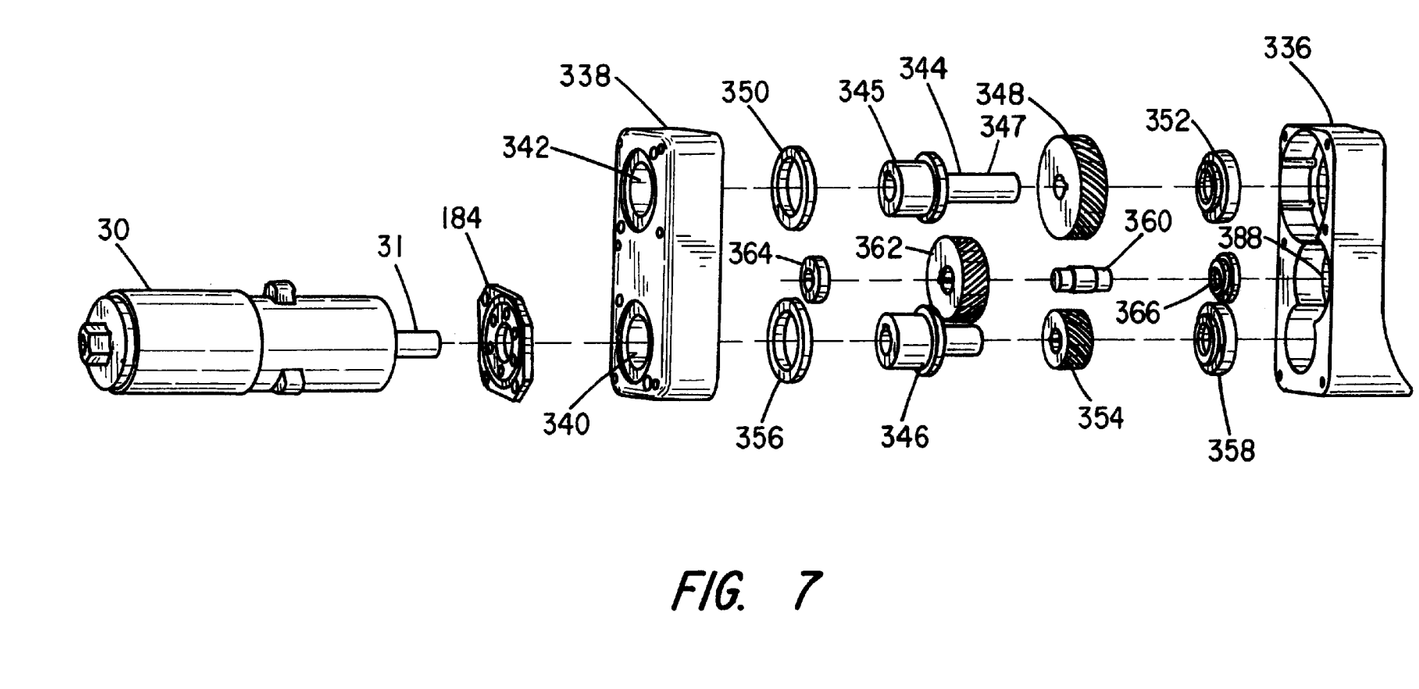
FIG. 7 is an optional dual speed bore bar drive mount assembly.

Aligned with the bore 340 in the cover 338 so as to accept the output shaft 31 of the drive motor 30 if the motor mount 184 is affixed over it is the shaft 346 on which is keyed a relatively small diameter helical gear 354. The shaft 346 is journaled in a fashion similar to the shaft 344 by means of bearing sets 356 and 358.

Also journaled for rotation between the shafts 344 and 346 is a pinion shaft 360 that has a helical gear 362 of an intermediate diameter keyed to its central portion. The opposed ends of the shaft 360 are journaled in bearing sets 364 and 366 which are designed to reside in a cylindrical bore 388 of the housing 336.

The diameters of the gears 348, 352 and 354 are selected such that if the shaft 344 is directly driven by the motor 30, the shaft 344 will be rotated at the full speed of the motor's output shaft 31. However, if the motor and motor mount are affixed to the cover 338 so as to directly drive the shaft 346, the gear box shaft 344 will be rotated at a predetermined fraction, e.g., one-half of the motor's output shaft 31. As mentioned above, the shaft 344 also drives the gear 172 (FIG. 2) that is arranged to mesh with the bore bar gear 160. Thus, depending upon which of the shaft's 344 and 346 is directly driven, the bore bar will be made to operate at a full speed or at a half speed.

It can be seen, then, that the present invention provides an extremely versatile, portable boring and facing machine that can be rapidly and easily set up in the field to perform boring and/or facing operations on a variety of work pieces. Ease of set-up results from the novel mounting bracket arrangement incorporating swivels. Precise control over boring bar rotation and axial feed are provided, the latter through the use of a variable speed AC servo motor. Moreover, a variety of prime movers can be used to impart the rotational motion to the boring bar in that the main drive housing can accommodate inputs from an electric motor, a hydraulic motor or an air motor, at the operator's option.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. A metal working machine for reboring or refacing a work piece comprising:

(a) an elongated, generally cylindrical bar member, the bar member having a longitudinal groove extending the length thereof;

(b) first and second mounting brackets attachable to the work piece at longitudinally spaced locations there along, each said mounting bracket including a bore containing an internal concave spherical surface for cooperating with a swivel member having an external convex spherical surface, the swivel member supporting bearings in which the bar member is journaled for rotation;

(c) an annular cutting-head member disposed about the cylindrical bar member and rotatable therewith, the annular cutting head member having a slide supporting a tool bit that is adapted to be moved in a radial direction;

(d) first drive means adapted to be coupled to the cylindrical bar member at one of a plurality of selectable locations along a length dimension thereof for rotating the cutting head member along with the cylindrical bar member;

(e) second drive means coupled to longitudinally translate the cutting head member; and (f) third drive means coupled to radially translate the slide whereby the tool bit is radially adjustable with respect to the workpiece.

2. The metal working machine of claim 1 wherein the first drive means includes one of an electrical motor, a hydraulic motor and an air motor.

3. The metal working machine of claim 2 wherein the first drive means includes a two speed gear box operatively coupled between an output shaft of the one motor and the cylindrical bar member.

4. The metal working machine of claim 1 and further including a plurality of set screws extending radially through the first and second mounting brackets for locking the internal concave spherical surface in a selected fixed position relative to the external convex spherical surface.

5. The metal working machine of claim 1 herein the cylindrical bar member includes a longitudinal groove formed inwardly of a peripheral surface thereof.

6. The metal working machine of claim 5 and further including:

(a) an elongated drive rod disposed in the longitudinal groove and journaled for rotation therein; and (b) the drive rod being of a polygonal cross-section and coupled to the cutting head member, said third drive means coupled in driving relation to the drive rod.

7. The metal working machine of claim 6 wherein the third drive means includes a variable speed AC motor having an output shaft coupled to the drive rod.

8. The metal working machine of claim, 7 and further including an electrical slip ring assembly for supplying electrical current to the AC motor.

9. The metal working machine of claim 6 and further including a hand wheel coupled to the drive rod for manual rotation thereof.

10. The metal working machine of claim 7 wherein the third drive means further includes a gear reduction box coupled between the output shaft of the AC motor and said drive rod.

11. The metal working machine of claim 1 wherein the cutting head member is axially positionable along the length of the cylindrical bar member.

12. The metal working machine of claim 11 wherein the cylindrical bar member is both rotatably journaled and axially slidable within the bearing retaining member.

13. The metal working member of claim 12 and further including means for axially translating the cylindrical bar member relative to the first and second mounting brackets.

14. The metal working member of claim 13 wherein the means for axially translating the cylindrical bar member includes a servo motor driven lead screw extending parallel to the cylindrical bar member and having a traveling nut thereon operatively coupled to the cylindrical bar member for axially displacing the cylindrical bar member in a direction determined by the direction of rotation of the lead screw.

15. The metal working member of claim 14 wherein the traveling nut is operatively coupled to the cylindrical bar member through a feed housing supporting bearings in which the cylindrical bar is journaled.

16. A metal working machine for reboring and refacing a workpiece, comprising:

(a) an elongated, generally cylindrical bar member, the bar member having a longitudinal, rectilinear groove formed inward from an outer surface thereof;

(b) a rod having a polygonal cross-section journaled for rotation in said groove;

(c) first and second mounting brackets adapted to be attached to the workpiece at spaced apart locations;

(d) bearing means in the mounting brackets for journaling the bar member for rotation about a longitudinal axis;

(e) a cutting head assembly adapted to secured to the bar member for rotation therewith, the cutting head assembly including a tool bit supported in a tool slide member;

(f) means for coupling the tool slide member to the rod whereby rotation of the rod translates the tool bit and tool slide member in a radial direction;

(g) an elongated, threaded lead screw having a traveling nut mounted thereon and operatively coupled to one of the mounting brackets and the bar member for translating the bar member and cutting head assembly in the axial direction upon rotation of said lead screw;

(h) a first drive motor for rotating the bar member within said bearing;

(i) a second drive motor for rotating said lead screw; and (j) a third drive motor for rotating the rod.

* * * * *